United States Patent
Duong (10) Patent No.: US 7,673,267 B1
(45) Date of Patent: Mar. 2, 2010

(54) METHOD AND APPARATUS FOR REDUCING JITTER IN AN INTEGRATED CIRCUIT

(75) Inventor: Anthony T. Duong, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 335 days.

(21) Appl. No.: 11/731,566

(22) Filed: Mar. 30, 2007

(51) Int. Cl.
  *G06F 17/50* (2006.01)

(52) U.S. Cl. .............................................. 716/6; 716/1

(58) Field of Classification Search ..................... 716/1, 716/5–6, 16–18
  See application file for complete search history.

(56) References Cited

U.S. PATENT DOCUMENTS

2003/0146777 A1 * 8/2003 Nadeau-Dostie et al. ...... 326/93
2008/0224714 A1 * 9/2008 Virutchapunt et al. ....... 324/602

* cited by examiner

*Primary Examiner*—Vuthe Siek
(74) *Attorney, Agent, or Firm*—Justin Liu; Thomas George; John J. King (57) ABSTRACT

Methods and circuits to reduce jitter in a design block including partitioning the design block. A circuit design is partitioned into multiple partitioned design blocks performing the same task as the original circuit deign. In one embodiment, a core clock signal is supplied to each of the partitioned design blocks, having a frequency higher than frequency of the reference clock signal. Additionally each of the partitioned design blocks receives a mutually exclusive enable signal, where each of the partitioned design blocks may be activated once at a given time.

19 Claims, 8 Drawing Sheets

METHOD AND APPARATUS FOR REDUCING JITTER IN AN INTEGRATED CIRCUIT

FIELD OF THE INVENTION

This invention relates generally to methods and apparatus for reducing jitter in integrated circuits (ICs), and more particularly to ICs including partitioned circuit designs.

BACKGROUND OF THE INVENTION

Jitter in integrated circuits has existed for a long time. Shrinking process technologies and increased clock speeds have brought this issue to the forefront. New designs attempt to balance jitter performance, speed, and design complexity, but as designs try to push speed and functionality performance boundaries, jitter performance is becoming a limiting factor.

In general, circuit designs includes clock(s), inputs, and generates outputs. Current and future circuit designs require higher input clock frequencies, and increased functionality for improved throughput. As speed and functionality increase, switching noise will proportionally increases. The switching noise from all the functional activities performed on clock edges will translate into increased jitter on at least one output of the circuit design. The increased jitter can negatively affect design performance. The negative effects range from degradation in IC performance to a total system failure.

Therefore, it is desirable to provide methods and circuits to manage output jitter of an IC. It is further desirable to provide methods to reduce jitter during the design phase of an IC.

SUMMARY OF THE INVENTION

In an embodiment of the present invention provide methods and circuits for reducing output jitter in an IC. In an embodiment of the present invention, a method for reducing jitter in an IC including partitioned design blocks, where the partitioned design block receives a core clock and a mutually exclusive enable signal. Each of the partitioned design blocks is activated once, corresponding to the numerous mutually exclusive enable signals.

In another embodiment of the present invention, a method for reducing jitter in a circuit design process including a reference clock and a design block. Partitioning the design block and coupling each of the partitioned design blocks a core clock, and one of mutually exclusive enable signals. The core clock can have a frequency higher than frequency of the reference clock. Each of the partitioned design blocks can be enabled once during each period of the reference clock.

In another embodiment of the present invention, a circuit design having partitioned design blocks, synchronizer block, and a clock manager circuit. The clock manager circuit may receive a clock frequency and generate clock outputs, each of the clock outputs may have the same frequency but a phase relatively different from one another. Clock outputs of the clock manager may be coupled to each of the partitioned design blocks.

DETAILED DESCRIPTION OF THE DRAWINGS

In the following description, numerous specific details are set forth to provide a more through understanding of the present invention. However, it will be apparent to one skilled in the art that the present invention can be practiced without these specific details. In other instances, well-known circuits and devices may be omitted or presented in an abstract form in order to avoid obscuring the present invention.

Embodiments of the present invention introduces concepts for managing jitter generated by switching logic in a design block. According to an embodiment of the present invention, utilizing clock gating and design partitioning can mitigate jitter generation by distributing smaller amounts of jitter over many clock cycles and reducing the size of the design block functioning/switching at any given clock edge.

Figure 1:
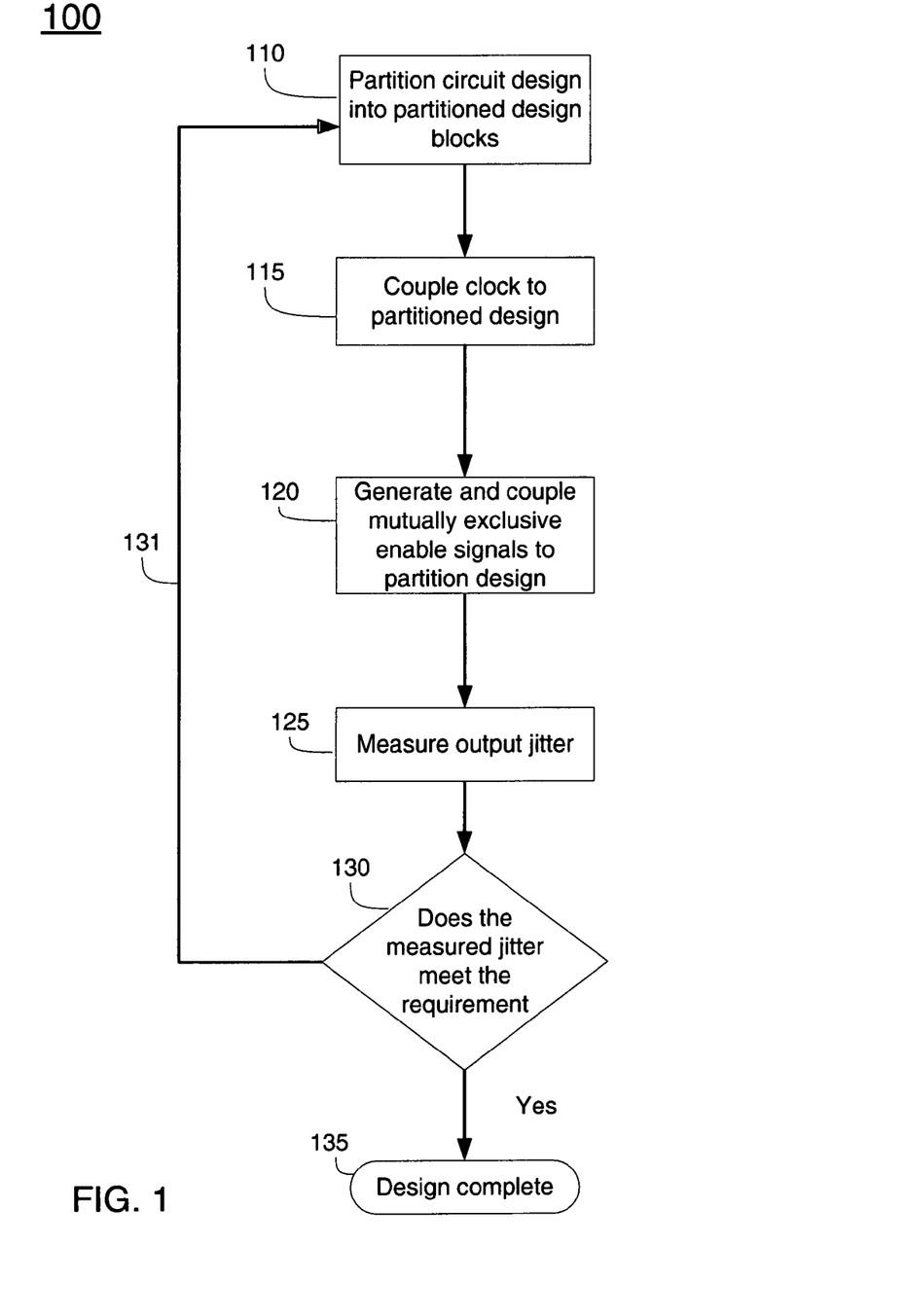
FIG. 1 is an illustration of a flow chart to implement a circuit design with reduced jitter, according to an embodiment of the present invention.

FIG. 1 is an illustration of a flow chart to implement a circuit design with reduced jitter, according to an embodiment of the present invention. The method starts by partitioning the circuit design into partitioned design blocks (Step 110), where the partitioned design blocks are generated from a design block having excessive jitter on its output. A clock is supplied to the partitioned design blocks (Step 115), where the clock may be coupled to each of the partitioned design blocks. Multiple mutually exclusive enable signals are generated, and each of the partitioned design blocks is supplied with one of the multiple mutually exclusive enable signals (Step 120). Jitter is measured or evaluated on at least one output of partitioned design block (Step 125). If the jitter assessment meets the design requirement (decision Step 130), the design is complete (Step 135). If the jitter assessment does not meet the design requirement (decision Step 130), branch 131 can be followed, and the design is re-partitioned (back to Step 110), where the re-partitioned design blocks are different from the initially partitioned design blocks. The steps of the method described above may be implemented in a software design that may automate at least one of the steps described above.

Figure 2A:
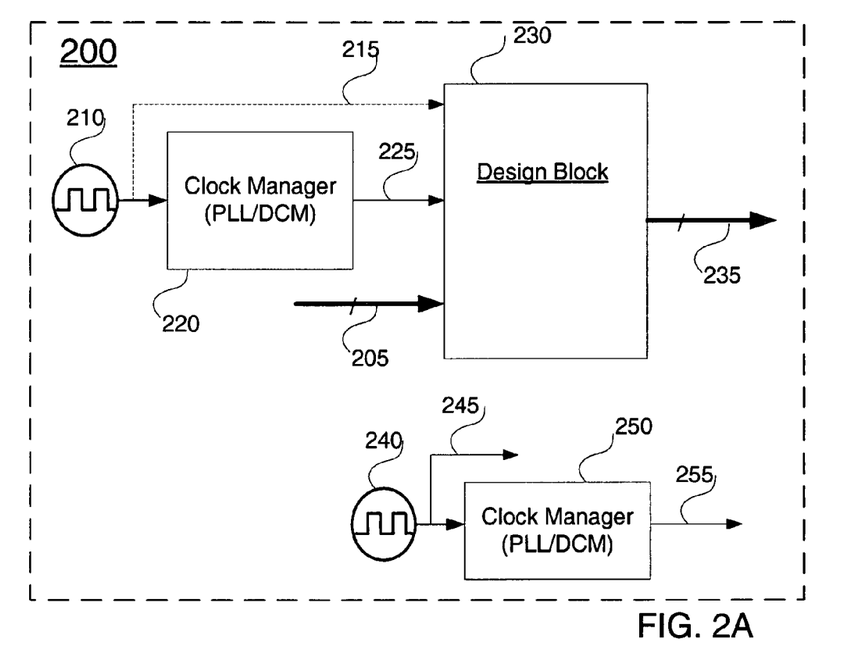
FIG. 2A is an illustration of a block diagram of a circuit design implementation.

FIG. 2A is an illustration of a block diagram of a circuit design implementation. Circuit 200 is a simplified example of a block diagram of a design block 230, receiving a clock signal 225, and having inputs 205 and outputs 235. Design block 230, for example, may have excessive jitter on outputs 235 that may exceed the design specification. Circuit 230 can receive a global or a reference clock signal 215 generated by source 210, or core clock signal 225 generated by a clock manager circuit 220. The source 210 can be internal or external to the circuit 200. The clock manager circuit 220 may be coupled to receive the clock source 210 and can generate a clock signal or a core clock signal 225, where the core clock signal 225 may have any frequency determined by the design specifications. An example of a clock manager circuit 220, can be a phase lock loop (PLL) or a clock multiplier. Other implementations of circuit 220 may be possible and are well know to persons skilled in the art. Circuit 200 may include other design blocks and clock manager circuits that could be impacted by the excessive jitter generated. In one example circuit 200 may include another clock manager circuit 250. Circuit 250 may be coupled to receive clock source 240, and can generate output 255. Jitter generated by design block 230 may affect multiple nodes of circuit 200. For instance, jitter generated by design block 230 may be coupled to node 235, node 245, node 255, node 225, and node 205. The coupling of the generated jitter may negatively affect the performance of circuit 200, or render it inoperable.

Figure 2B:
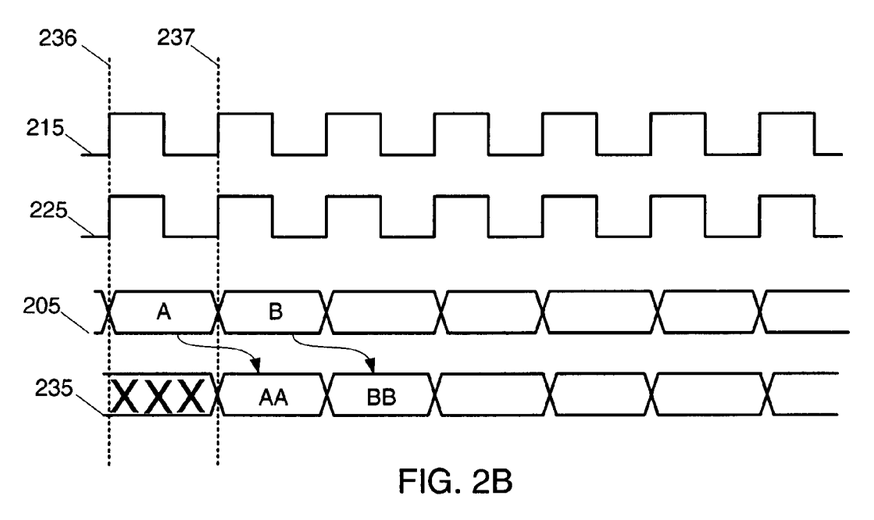
FIG. 2B is an illustration of a timing diagram of the circuit design shown in FIG. 2A.

FIG. 2B is an illustration of a timing diagram of the circuit design shown in FIG. 2A. FIG. 2B is a simplified timing diagram showing the relationship between inputs and outputs for a typical design block such as design block 230. Reference clock signal 215 and core clock signal 225 may have the same period according to some embodiments. In general, it takes at least one clock cycle for data to propagate from the input to the output. This is illustrated in the example of FIG. 2B, where an input value A is provided by the inputs 205 at time 236, and the corresponding output value AA can be observed at the outputs 235 at time 237, one clock cycle later.

Figure 3:
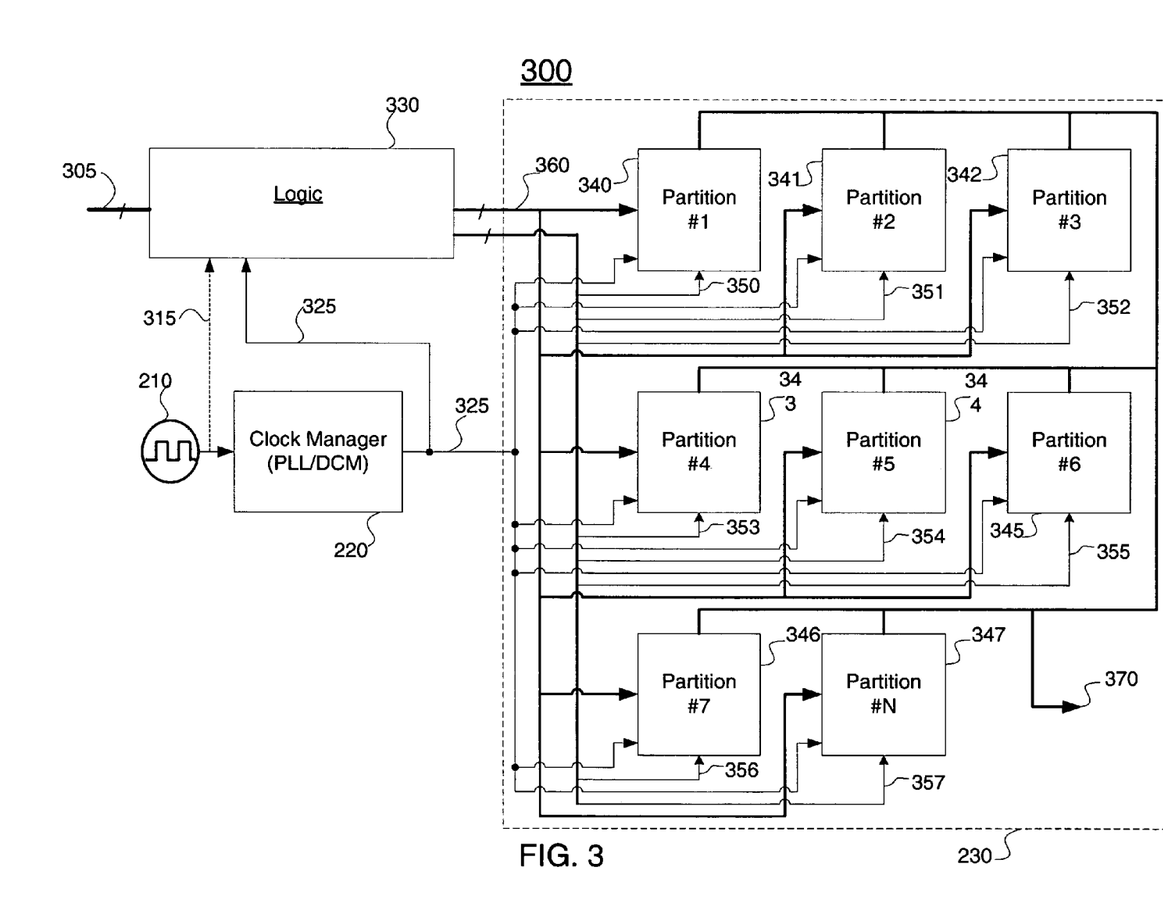
FIG. 3 is a block diagram of a circuit design implementation with reduced jitter, according to an embodiment of the present invention.

FIG. 3 is a block diagram of a circuit design implementation with reduced jitter, according to an embodiment of the present invention. Circuit 300 includes multiple partitioned design blocks 340-347, a logic circuit 330, and a clock manager circuit 220. Reference clock source 210 has an output, clock signal 315, which can have an output frequency X. Clock signal 315 can be connected to an input of the clock manager circuit 220. Clock manager circuit 220 has at least one clock output 325, where clock signal 325 has a frequency higher than X. Examples of a clock manager circuit according to various embodiments can be a PLL or clock multiplier or a digital clock manager (DCM) of a programmable logic device (PLD). Other implementations of circuit 220 are possible and well-know to persons skilled in the art. In the example of FIG. 3, there are eight partitions, although in general there maybe an arbitrary number of partitions (N) greater than one. The clock signal 325 may have a frequency equal to or greater than (N*X). For instance in the example of FIG. 3, the frequency of clock signal 325 is (8*X):

(The number of partitions (8) multiplied by frequency of the reference clock source 210 (X)).

Clock signal 315 and clock signal 325 may be connected to inputs of the logic circuit 330. Logic circuit 330 generates multiple mutually exclusive enable signals 350-357, and they may be coupled to respective partitioned design blocks 340-347. Logic circuit 330, for example, can be a shift register or a decoder circuit, or a state machine including counter circuits, or a combination of the above mentioned examples. Other circuits and implementations to build the logic circuit 330 may be possible and well known to persons skilled in the art. As shown in FIG. 3, the mutually exclusive enable signal 350 is connected to partitioned design block 340, and the mutually exclusive enable signal 351 is connected to partitioned design block 341. Each of the mutually exclusive enable signals 352-357 maybe connected in a similar manner to their respective partitioned design block. In an embodiment of the present invention, inputs 305 are connected to an input terminal of circuit 330 and outputs 360 are connected to each of the partitioned design blocks 340-347. According to an embodiment of the present invention, the partitioned design blocks 340-347 maybe coupled to each other in a predetermined sequence. Connecting the partitioned design blocks 340-347 in a predetermined sequence can preserve the functionality and top level connectivity of design block 230 of FIG. 2A. The jitter can be measured and evaluated on at least one output, for example output signal 370. The jitter measured from output signal 370 can be compared to jitter measured on output signal 235 of FIG. 2A, where we may determine that the jitter of design block 230 of FIG. 3 is reduced. In another example jitter may be measured on other nodes, for instance, jitter may be measured on clock signals 315 and 325 and the measured result may be compared to measured jitter at clock nodes 215 and 225 of circuit 200. Difference in measured jitter between jitter measured on node 315 and 215 and/or node 325 and 225 may indicate a direct correlation to enhanced jitter performance. Circuit 300 may also include additional circuit designs and clock managers that may also benefit from the reduced or minimized jitter.

Figure 4:
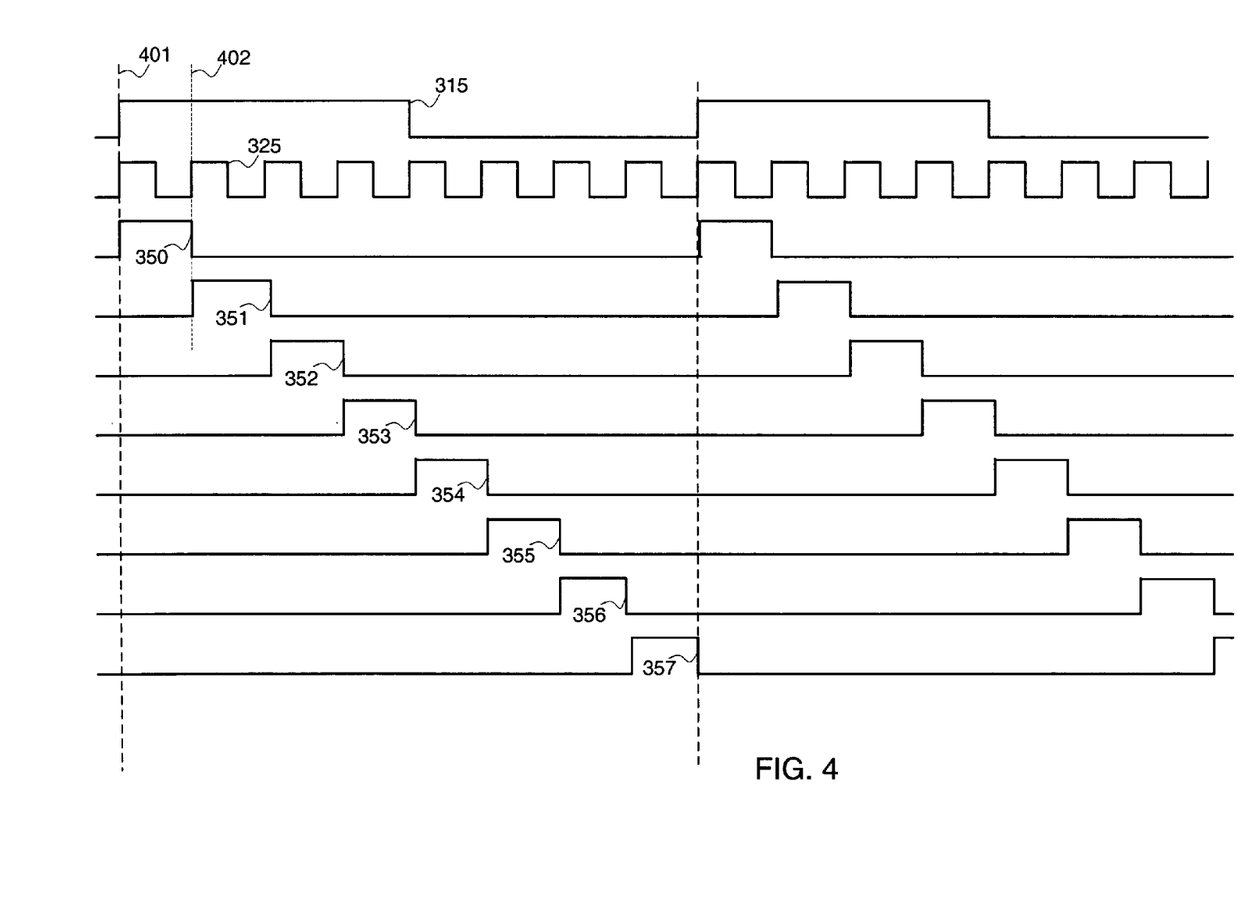
FIG. 4 is a timing diagram of the circuit design shown in FIG. 3.

FIG. 4 is a timing diagram of the circuit design shown in FIG. 3. Clock signal 315 can have a frequency "X". Clock signal 325 is an output of the clock manager circuit 220, and according to one embodiment, it can have a frequency of (8x). Signals 350-357 are the mutually exclusive enabled signals generated by the logic circuit 330 of FIG. 3, and they are connected to respective inputs of the partitioned design blocks 340-347. The timing diagram shown of FIG. 4, each of the signals 350-357 is asserted once during every period of clock signal 315, therefore they are mutually exclusive. The mutually exclusive enable signals 350-357 can be synchronous with clock signal 325. It is shown in the timing diagram of FIG. 4 an example of a synchronous implementation. At rising edge of clock signal 325, time line 401, signal 350 is asserted. Since signal 350 may be connected to partitioned design block 340, partitioned design block 340 can be enabled. Partitioned design block 340 can process data and generate an output as long as signal 350 is asserted and clock signal 325 is oscillating. At another rising edge of clock signal 325, time line 402, signal 350 is disabled and signal 351 is asserted. Asserting signal 351 corresponds to partitioned design blocks 341 getting enabled. Partitioned design block 341 can process data and generates outputs as long as signal 351 is asserted and clock signal 325 is oscillating. Activating partitioned design blocks 342-347 follows the same pattern as discussed above. Each partitioned design block 340-347 may be activated once during every clock cycle of clock signal 315, and only one partitioned design block may be activated at a given time.

The above circuit design implementation can produce a circuit design with reduced output jitter. The reduced jitter is the product of controlling switching noise. The switching noise is controlled by reducing the number of logic cells toggling at a given clock edge, for example the clock edge of clock signal 315. In the example shown of FIG. 3 and FIG. 4, design block 230 is partitioned in accordance with the functionality and the performance requirements. The number and the size of partitioned design blocks can vary from one design block to another. Also note that the location may be different, and partitioned design blocks may be non contiguous, etc. In some embodiments, the number and size of partitioned design blocks can vary during re-partitioning, which may occur during the process of optimizing the design block for jitter performance. The number of partitioned design block of design block 230 of FIG. 3 can be activated individually and the jitter generated by each partition is a fraction from jitter generated by the design block 230 of FIG. 2A.

In some embodiments, the partitioned design blocks are connected in a predetermined sequence that may have the same functionality as design block 230, and may have improved performance. The partitions are coupled to one another and enabled in a sequence, such that outputs of the last partitioned design block can provide the same result as output 235 of design block 230 of FIG. 2A. In some embodiment a benefit of partitioned design blocks may reduce dv/dt at a given clock edge. The design block 230 of FIG. 2A may switch all the logic cells within the circuit design on a given edge of clock signal 215 or clock signal 225 of FIG. 2B. The switching of all the logic cells of the circuit design can modulate the power supply rails. This modulation can vary from one clock cycle to another, depending on the operations being performed by the logic cells. The modulation may cause uncertainty on output signals 235 of FIG. 2A. The uncertainty on output signals 235 at given edge of clock signal 215 or 225 can be the undesirable jitter. Partitioning the circuit design into partitioned design blocks can reduce this jitter.

Figure 5A:
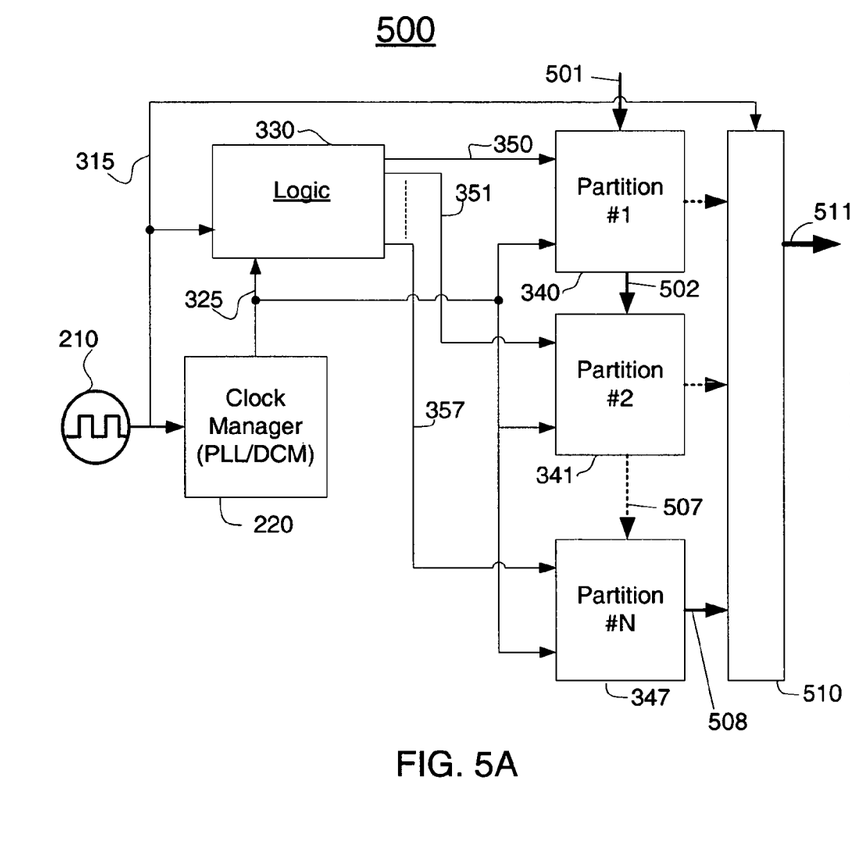
FIG. 5A is a block diagram of a circuit design implementation with reduced jitter, according to an embodiment of the present invention.

FIG. 5A is a block diagram of a circuit design implementation with reduced jitter according to an embodiment of the present invention. Circuit 500 is a simplified block diagram showing one embodiment of the present invention. Functional operation of circuit 500 is similar to circuit 230 of FIG. 3. Synchronizer block 510 can be used as a synchronizing bridge between signals clocked by clock signal 325 and signals clocked by clock signal 315. For example, in one embodiment, signals 508 are synchronized to clock signal 325 and they are connected to input of circuit 510. Output signals 511 of circuit 510 are synchronized or aligned to clock 315. Output signals 511 can be accessed as an input by other circuits or devices using clock signal 315 to synchronize its operation. Output signals 511 in one embodiment can represent output signals 235 of the design block 230 of FIG. 2A. The synchronizer block 510 can be implemented as a shift register, or a first in first out (FIFO) circuit, or other circuits that can synchronize between two clock domains which are well known to persons skilled in the art.

Figure 5B:
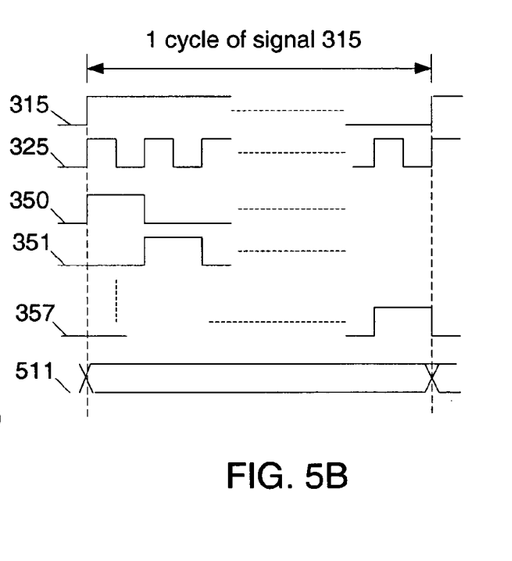
FIG. 5B is a timing diagram of the circuit design shown in FIG. 5A.

FIG. 5B is a timing diagram that may represent the operation of circuit 500 of FIG. 5A. The timing diagram of FIG. 5B may be similar to timing diagram of FIG. 4. Therefore, the timing diagram of FIG. 4 may be examined for detailed explanation of events relevant to the clock signals and enable signals. FIG. 5B also illustrates the timing of signal 511. In an example, signal 511 may transition relative to the rising edge of clock signal 315. Therefore, signal 511 may be synchronous to clock signal 315.

Many digital circuit designs are synchronous designs, meaning that signals may transition at a given clock edge. Usually the clock source used to synchronize data can be a reference clock source or a system clock source. There are many reasons for using a synchronous designs. In one example relevant to this application, communication between multiple modules can be established at a given clock source. The clock source between said modules can be the same. Therefore, in order to maintain reliable and error-free communication between said modules, it is imperative to incorporate a synchronous design practice.

The examples given above are related to implementations of embodiments of the present invention in an integrated circuit. The above method steps and apparatuses can also be implemented in a programmable logic device (PLD). The PLD has many advantages, and one example of such advantage is related to the capability of logic re-configuration and re-design without the need to fabricate new silicon wafers. The PLD has many configurable logic resources available witch facilitate the construction of partitioned design blocks. A PLD may also include other resources, such as PLLs, Delay lock loops (DLLs), clock multipliers, and memory blocks that can be used to form any circuit design. That renders the PLD a very flexible and useful platform to partition design blocks.

Figure 6:
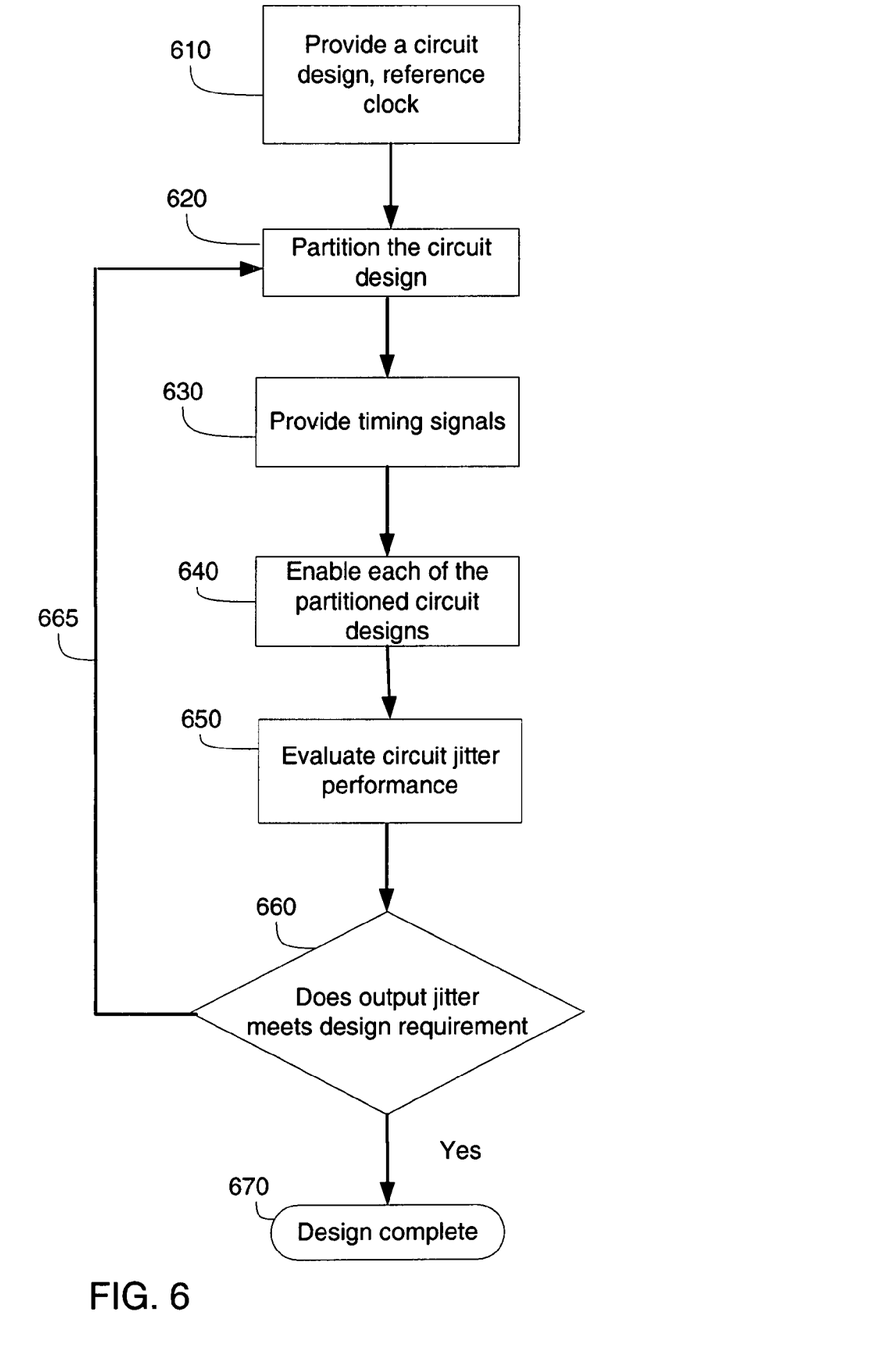
FIG. 6 is a flow chart for a method to design a circuit with reduced jitter, according to an embodiment of the present invention.

FIG. 6 is a flowchart for a method to design a circuit with reduced jitter, according to an embodiment of the present invention. The method starts by providing a circuit design and a reference clock source (Step 610) where the circuit design may have high output jitter. The circuit design is partitioned (Step 620) into multiple partitioned design blocks performing the same task or tasks as the circuit design provided in step 610. The number of partitioned design blocks can be greater than one, and the size of the partitioned design blocks can be arbitrary. Timing signals may be provided (Step 630), where each the timing signals may be coupled to each of the partitioned design blocks. In one example, the timing signals may be clock signals having the same frequency but different phase offset from one another as will be described with respect to FIGS. 7 & 8. In another example, the timing signals may be multiple mutually exclusive enable signals, as described above with respect to FIGS. 3-5, where the number of the mutually exclusive enable signals can be equal the number of partitioned design blocks. Each of the multiple mutually exclusive enable signals may be supplied to their respective partitioned design block. Also, a clock signal or a core clock may be coupled to each of the plurality of design blocks. The frequency of the clock signal or core clock may depend on the number of partitioned design blocks. The partitioned design blocks may be enabled (step 640), where each of the partitioned design blocks may be activated within one cycle of the reference clock. The activating or the enabling of the partitioned design blocks may be accomplished by gating the core clock using each of the plurality of mutually exclusive enable signals coupled to each partitioned design block, by using clocks with phase offsets or by other known methods. Jitter performance of the partitioned design blocks is evaluated (Step 650), where the partitioned design blocks may have reduced output jitter. A decision can be made (Decision step 660), and if the jitter performance meets the design requirement, then the design is compete (Step 670). If the jitter performance does not meet the design requirement (Branch 665 and go back to step 620) the circuit design provided in step 610 may be re-partitioned. The re-partitioned design blocks may be different from the initial partitioned design blocks, meaning the number of partitions, the location of, and/or the size of the partitioned design blocks can be different.

An example of the above method steps, a circuit design with output jitter can be partitioned. The partitioning can for example take place in a simulation environment or using a PLD. Clock signals and control signals can be applied to the partitions, and jitter performance can be measured for evaluation. Benefits of performing the partitioning may extend beyond improving jitter performance of a circuit design. Partitioning may also reduce noise generated by power supply by reducing dv/dt. Other benefits can include for example, shrinking power supply rail route thickness on an IC, reducing or minimizing IC radiation, adding more circuits on an IC for added functionality and features, increasing printed circuit boards (PCB) signals routes density, reduce or minimize decoupling requirements on the power supply routes on a PCB.

Figure 7:
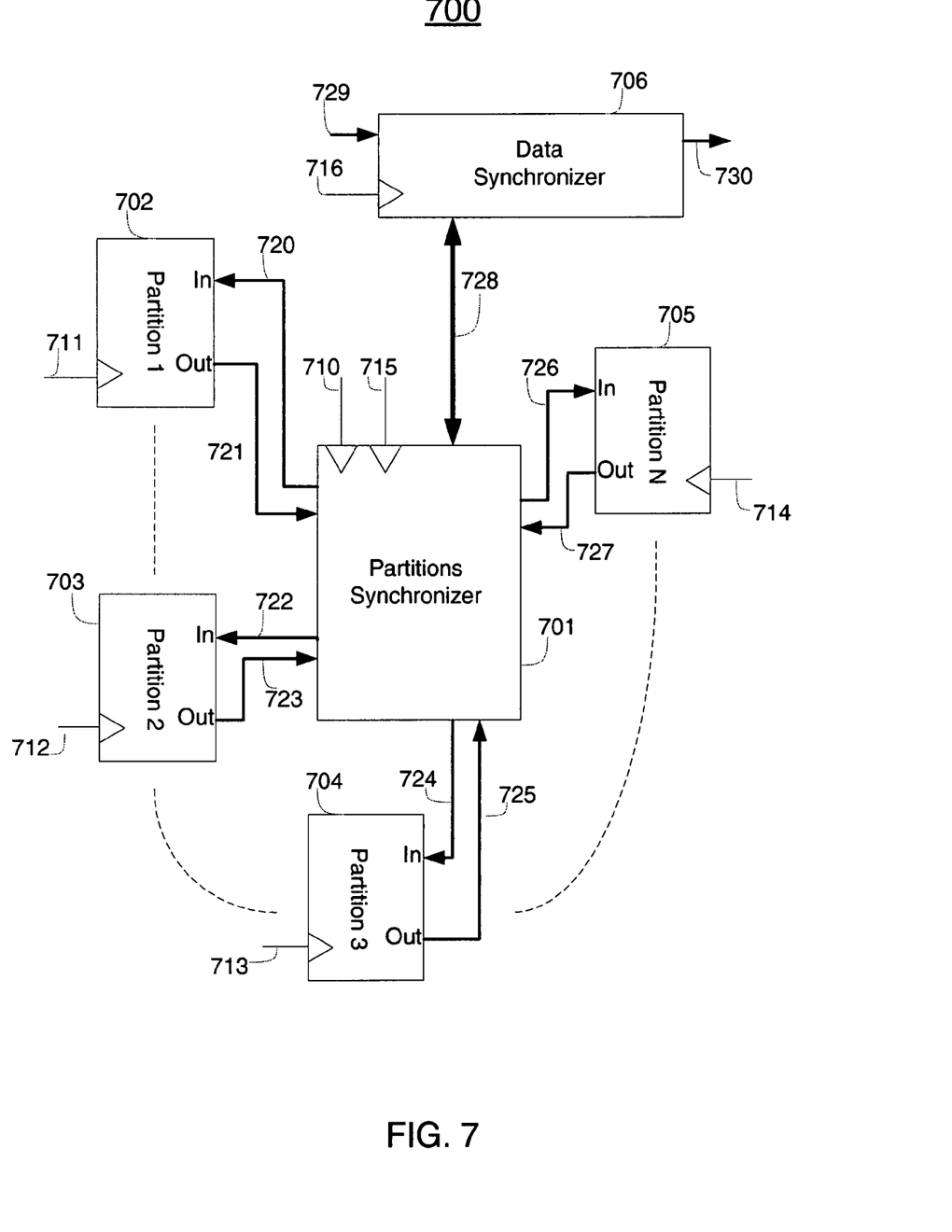
FIG. 7 is a block diagram of a circuit design with reduced jitter, according to an embodiment of the present invention.

FIG. 7 illustrates a block diagram of circuit 700 including multiple partitioned design blocks 702-705, partitions synchronizer or a synchronizer block 701, and data synchronizer 706, according to one embodiment of the present invention. Circuit 700 may include partition design blocks 702-705, each have a unique clock signal 711-714 coupled to their inputs. Clock signals 711-714 may have the same frequency but different phases relative to one another. For example, clock signal 711, and clock signal 712 may have the same frequency X, but clock signal 712 can have a phase different from phase of the clock signal 711. For instance clock signal 712 may have a 90 degrees phase difference relative to clock signal 711. The phase relationship between the clock inputs 711-714 may have a range 0°-359° (°=degrees), based on the design implementation, which may include the jitter performance of circuit 700. Clock signal 710 may have a frequency higher than clock signals 711-714. Also, clock signal 710 may have a frequency equivalent to the frequency of clock signals 711-714 multiplied by the number of partition design blocks. Clock signal 710 may be needed to handle signals transactions between the partitioned design blocks 702-705 and the synchronizer block 701, such implementations are well known to skilled persons in the art. For example, circuit 700 may have four partitions 702-705, and clock signals 711-714 may have frequency X. Therefore, clock signal 710 may have a frequency of 4x.

Circuit 700 may include partition synchronizer block 701. Block 701 may receive clock signals 710 and 715, inputs 721, 723, 725, 727, and I/O (input/output) 728. Synchronizer block 701 can also provide outputs 720, 722, 724, 726. Synchronizer block 701 may synchronize input signals and output signals between the multiple partition design blocks 702-705, and also may be the primary interface for signal transactions between the partition design blocks 702-705 and other circuits. For instance circuit 701 can interface with circuit 706. Circuit 701 may include, for example, combinational logic and flip-flops or shift registers or a memory module with a memory controller or a state machine or a combination of the above mentioned circuits. Other implementations of circuit 701 are possible and it is well know to persons skilled in the art. In one example, Block 701 may be coupled to I/O 728. The output of I/O 728 may represent the collective outputs from all the partitioned design blocks 702-705. Circuit 700 may also include a data synchronizer block 706. Data synchronizer block 706 may be coupled to an input clock 716, input signal 729, output signal 730, and I/O 728 from block 701. Input clock 716 can have the same frequency as clock 715 but it may have a different phase. Block 706 may have a primary function of synchronizing or aligning I/O signals 728 received from block 701 to clock 716. In one example, output 730 may be the output signal of block 706, and it may be synchronous to clock 716. Output 730 may have the same information as output from block 701 driven on I/O signal 728. Similarly, I/O signal 728 may have the same information as input 729 of block 706. Data synchronizer block 706 may be a shift register or a FIFO (First In First Out) memory, or other circuit designs that are well know to persons skilled in the art.

Figure 8:
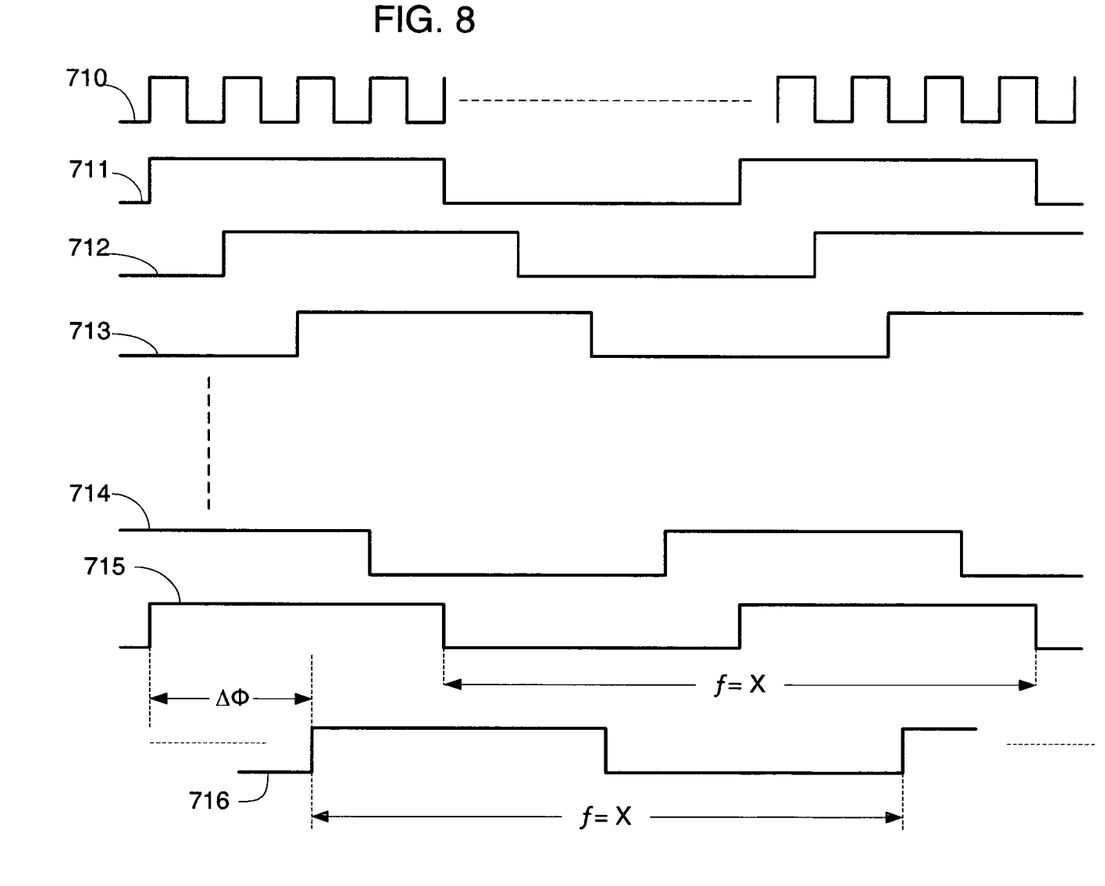
FIG. 8 is a timing diagram of the circuit design shown in FIG. 7.

FIG. 8 is an illustration of a timing diagram depicting clocks and relationships between them according to an embodiment of the present invention. FIG. 8 may represent the timing diagram for clocks coupled the multiple partitioned design blocks and other designs shown in circuit 700 of FIG. 7. Clock signals 711-716 may have the same frequency (f=X), but each clock may have a phase different from the phase of the other clock signals. The absolute value of the phase difference between the clock inputs may differ according to design specifications and/or circuit 700 jitter performance. The number of clock signals, and therefore phases, may at least equal the number of partitioned design blocks of circuit 700. One example, clock signal 715 and clock signal 716 may have the same frequency (f=X), but they have different phases. For instance, phase difference between clock signal 715 and 716 may be ΔΦ. Clock 710 may have a frequency different from frequency of clocks 711-716. The frequency of clock 710 may be calculated as the frequency of clocks 711-716 multiplied by the number of phases. One example, if a design require N phases, to achieve the jitter performance desired, and the frequency of clocks 711-716 is X. Therefore, the frequency of clock 710 may be N*X.

Further, transistors, level shifters, P-channel transistors, N-channel transistors, biasing circuits, oscillators, clock dividers, clock multipliers, clock managers, and other components other than those described herein can be used to implement the invention. Active-high signals can be replaced with active-low signals, and clock rising edges can be replaced by clock falling edges, by making straightforward alterations to the circuitry, such as are well known in the art of circuit design. In one example, falling edge of clock signal 325 of FIG. 4 may be used to sample signals. Logical circuits can be replaced by their logical equivalents by appropriately inverting input and output signals, as is also well known.

Moreover, some components are shown directly connected to one another while others are shown connected via intermediate components. In each instance the method of interconnection establishes some desired electrical communication between two or more circuit nodes. Such communication can often be accomplished using a number of circuit configurations, as will be understood by those of skill in the art.

Accordingly, all such modifications and additions are deemed to be within the scope of the invention, which is to be limited only by the appended claims and their equivalents. Note that claims listing steps do not imply any order of the steps.

What is claimed is:

1. A method for reducing jitter in an integrated circuit (IC), comprising:
    partitioning, by a processor a design block of the IC into a plurality of partitioned design blocks;
    coupling a core clock to each of the plurality of partitioned design blocks;
    generating a plurality of mutually exclusive enable signals;
    coupling one of the plurality of mutually exclusive enable signals to each of the plurality of partitioned design blocks; and
    gating the core clock for each of the plurality of partitioned design blocks with a corresponding mutually exclusive enable signal which enables a partitioned design block of the plurality of partitioned design blocks to process data when the corresponding mutually exclusive enable signal is asserted,
    wherein only one partitioned design block of the plurality of partitioned design blocks is enabled at a given time, and jitter of at least one output of the IC is reduced.

2. The method recited in claim 1, further comprising generating the core clock from a reference clock, wherein the core clock has a frequency higher than frequency of the reference clock.

3. The method recited in claim 2, wherein the generating the plurality of mutually exclusive enable signals comprises generating the plurality of mutually exclusive enable signals based on the core clock and the reference clock,
    wherein each of the plurality of mutually exclusive enable signals is activated once during every period of the reference clock.

4. The method recited in claim 1, further comprising activating each of the plurality of partitioned design blocks according to a predetermined sequence.

5. An integrated circuit (IC) having reduced jitter, comprising:
   a design block partitioned into a plurality of partitioned design blocks; and
   a timing circuit coupled to receive a reference clock, the timing circuit generating a plurality of timing signals,
   wherein each of the plurality of timing signals is coupled to a selected partitioned design block of the plurality of partitioned design blocks,
   wherein the plurality of timing signals activate only one of the plurality of partitioned design blocks at a given time, and
   wherein each of the plurality of partitioned design blocks is activated once within a period of the reference clock.

6. The IC recited in claim 5, wherein the IC is a programmable logic device (PLD).

7. The IC recited in claim 6, further comprising a data synchronizer circuit coupled to outputs of the plurality of design blocks.

8. The IC recited in claim 6, wherein the timing circuit is a clock manager of the PLD, and wherein the clock manager generates a core clock having a frequency higher than a frequency of the reference clock.

9. The IC recited in claim 8, further comprising a logic circuit receiving the core clock and the reference clock and generating a plurality of mutually exclusive enable signals.

10. The IC recited in claim 9, further comprising coupling at least one of the plurality of mutually exclusive enable signals and the core clock to each of the plurality of partitioned design blocks.

11. The IC recited in claim 6, wherein the plurality of timing signals is a plurality of clock signals each having a same frequency and a phase relatively different from one another.

12. The IC recited in claim 11, further comprising a partition synchronizer circuit coupled to each of the plurality of partitioned design blocks, wherein the partition synchronizer circuit synchronizes signals between the plurality of partitioned design blocks.

13. A method for reducing jitter in an integrated circuit using a circuit design process, comprising:
   providing a circuit design including a reference clock source;
   partitioning, by a processor the circuit design of the IC into a first plurality of partitioned design blocks, wherein the first plurality of partitioned design blocks perform a same task as the circuit design;
   providing a plurality of timing signals based on the reference clock source; and
   coupling one of the plurality of timing signals to each of the first plurality of partitioned design blocks;
   wherein the plurality of timing signals is a plurality of mutually exclusive enable signals which enables a partitioned design block of the plurality of partitioned design blocks to process data when the corresponding mutually exclusive enable signal is asserted and causes each of the first plurality of partitioned design blocks to be enabled once within one period of the reference clock source.

14. The method recited in claim 13, wherein each of the plurality of mutually exclusive signals enables only one partitioned design block of the first partitioned design blocks.

15. The method recited in claim 14, further comprising synchronizing outputs of the first plurality of partitioned design blocks to the reference clock source.

16. The method recited in claim 15 further comprising:
   evaluating jitter of at least one output of the first plurality of partitioned design blocks; and
   if the evaluated jitter does not meet a design requirement, re-partitioning the circuit design into a second plurality of partitioned design blocks, wherein the second plurality of partitioned design blocks is different from the first plurality of partitioned design blocks.

17. The method recited in claim 13, wherein the plurality of timing signals is a plurality of clock signals, and wherein the plurality of clock signals have same frequency, wherein each of the plurality of clock signals has a clock phase relatively different from one another.

18. The method recited in claim 17, further comprising coupling each of the first plurality of partitioned design blocks to a synchronizer block receiving the reference clock source.

19. The method recited in claim 17 further comprising:
   evaluating jitter of at least one output of the first plurality of partitioned design blocks; and if the evaluated jitter does not meet a design requirement, re-partitioning the circuit design into a second plurality of partitioned design blocks, wherein the second plurality of partitioned design blocks is different from the first plurality of partitioned design blocks.

* * * * *